(12) United States Patent
Noda et al.

(10) Patent No.: US 7,559,979 B2
(45) Date of Patent: Jul. 14, 2009

(54) HYDROGEN SEPARATOR AND METHOD FOR PRODUCTION THEREOF

(75) Inventors: Ken-ichi Noda, Nagoya (JP); Osamu Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 528 days.

(21) Appl. No.: 11/340,892

(22) Filed: Jan. 27, 2006

(65) Prior Publication Data

US 2006/0174767 A1    Aug. 10, 2006

(30) Foreign Application Priority Data

Feb. 4, 2005 (JP) ............................. 2005-029498

(51) Int. Cl.
*B01D 53/22* (2006.01)

(52) U.S. Cl. ................. 96/11; 96/4; 96/10; 95/55; 95/56; 427/294; 427/299; 427/443.1

(58) Field of Classification Search ............... 95/45, 95/55, 56; 96/4, 10, 11; 55/523, 524, DIG. 5; 427/294, 299, 443.1
See application file for complete search history.

(56) References Cited

U.S. PATENT DOCUMENTS

| | | | | |
|---|---|---|---|---|
| 4,230,463 A * | 10/1980 | Henis et al. | .................. | 95/55 |
| 4,689,150 A * | 8/1987 | Abe et al. | .................. | 96/11 |
| 5,980,989 A * | 11/1999 | Takahashi et al. | .............. | 96/11 |
| 6,641,647 B2 * | 11/2003 | Uemura et al. | ................ | 96/11 |
| 6,649,559 B2 * | 11/2003 | Drost et al. | .................. | 95/56 |
| 6,899,744 B2 * | 5/2005 | Mundschau | .................. | 95/56 |
| 7,255,726 B2 * | 8/2007 | Ma et al. | .................. | 95/56 |
| 2005/0072304 A1 * | 4/2005 | Etievant et al. | ............... | 96/11 |

FOREIGN PATENT DOCUMENTS

| | | |
|---|---|---|
| EP | 0715880 | 6/1996 |
| EP | 0818233 | 1/1998 |
| EP | 0822161 | 2/1998 |
| JP | 06-277472 | 10/1994 |
| JP | 10-113545 | 5/1998 |
| JP | 2000-317282 | 11/2000 |
| JP | 2003-190748 | 7/2003 |

* cited by examiner

*Primary Examiner*—Jason M Greene
(74) *Attorney, Agent, or Firm*—Burr & Brown

(57) ABSTRACT

A hydrogen separator is provided, including a porous substrate having a large number of pores communicating from a first surface to a second surface thereof, and having a hydrogen-separating layer disposed on the first surface so that the hydrogen-separating layer has a penetrated portion extending through the pores from the first surface to a particular depth. An average pore diameter at the first surface of the porous substrate is 0.02 to 0.5 μm, a thickness of the hydrogen-separating layer is 1 to 5 μm, and a penetration depth of the penetrated portion is 0.05 to 1 μm, is at least equal to the average pore diameter at the one surface of the porous substrate, and is not larger than one half of the thickness of the hydrogen-separating layer. The hydrogen separator hardly generates defects such as cracks, peeling and the like in the hydrogen-separating layer, is superior in durability, and provides both good hydrogen-separating ability and good hydrogen permeability.

9 Claims, 2 Drawing Sheets

HYDROGEN SEPARATOR AND METHOD FOR PRODUCTION THEREOF

BACKGROUND OF THE INVENTION AND RELATED ART STATEMENT

The present invention relates to a hydrogen separator. More particularly, the present invention relates to a hydrogen separator which is superior in durability and has good hydrogen permeability, etc.

A hydrogen separator comprising a porous ceramic substrate and a hydrogen-separating layer made of palladium or the like, formed on the substrate has been used in order to separate only hydrogen selectively from a hydrogen-containing gas such as steam-reformed gas or the like. Such a hydrogen separator is used, in some cases, for selection of only hydrogen at high temperatures. Therefore, the hydrogen separator is required to have high gas tightness at high temperatures or in an environment where temperature increase and decrease is repeated.

As shown in FIG. 2, ordinary hydrogen separators have a structure comprising a porous substrate 12 and a hydrogen-separating layer 13 disposed on the first surface 5 of the porous substrate 12 in a state that the hydrogen-separating layer has a penetrated portion 17 formed so as to extend from the first surface 5 to a particular depth (the penetration depth $D_2$ of the penetrated portion). Incidentally, the porous substrate 12 has a large number of pores communicating from the first surface 5 to the second surface (not shown) and is constituted by, for example, ceramic particles. In producing a hydrogen separator 11 having a structure shown in FIG. 2, disposition of a hydrogen-separating layer 13 can be conducted, for example, by the plating methods with pressure difference disclosed in the following patent literatures 1 to 4.

Patent literature 1: JP-3213430
Patent literature 2: JP-A-2003-190748
Patent literature 3: JP-A-1998-113545
Patent literature 4: JP-2000-317282

Incidentally, in these plating methods with pressure difference, the diameters of the pores at the first surface 5 of the porous substrate 12 are set small and the hydrogen-separating layer 13 is formed as a thin film, whereby generation of defects such as cracks and the like in the hydrogen-separating layer 13 is prevented.

However, when the pore diameters of the porous substrate are too small and if the penetration depth of the penetrated portion formed is too large, there is a problem that permeation of hydrogen present in a to-be-treated gas mixture is prevented and no good hydrogen permeability is obtained. Meanwhile, if the penetration depth of the penetrated portion formed is too small, there is a problem that the adhesivity between the hydrogen-separating layer and the porous substrate is low, the hydrogen-separating layer tends to peel off, and the hydrogen separator is low in durability.

SUMMARY OF THE INVENTION

The present invention has been made in view of the above problems of conventional techniques. The present invention aims at providing a hydrogen separator which hardly generates defects such as cracks, peeling and the like in the hydrogen-separating layer, is superior in durability and satisfies both of good hydrogen-separating ability and good hydrogen permeability.

The present inventors made a study in order to achieve the above aim. As a result, it was found that the above aim could be achieved by setting, in particular ranges, (a) the average pore diameter at the surface of a porous substrate on which a hydrogen-separating layer is to be disposed and (b) the penetration depth of a penetrated portion formed. This finding has led to the completion of the present invention.

According to a first aspect of the present invention, a hydrogen separator is provided, comprising a porous substrate having a large number of pores communicating from a first surface to a second surface thereof, and a hydrogen-separating layer disposed on the first surface of the porous substrate so that the hydrogen-separating layer has a penetrated portion extending through the pores from the first surface to a particular depth. An average pore diameter at the first surface of the porous substrate whereon the hydrogen-separating layer is disposed is 0.02 to 0.5 µm, a thickness of the hydrogen-separating layer is 1 to 5 µm, and a penetration depth of the penetrated portion is 0.05 to 1 µm, is at least equal to the average pore diameter at the first surface of the porous substrate whereon the hydrogen-separating layer disposed, and is not larger than one half of the thickness of the hydrogen-separating layer.

According to a second aspect of the present invention, the hydrogen separator according to the first aspect is provided, wherein a surface roughness Ra at the first surface of the porous substrate whereon the hydrogen-separating layer is disposed is 1 µm or less.

According to a third aspect of the present invention, a hydrogen separator according to the first or second aspects is provided, wherein the porous substrate is composed mainly of a ceramic.

According to a fourth aspect of the present invention, a hydrogen separator according to any of the first through third aspects is provided, wherein the hydrogen-separating layer is made of a hydrogen permselective metal.

According to a fifth aspect of the present invention, a hydrogen separator according to the fourth aspect is provided, wherein the hydrogen permselective metal is Pd or an alloy containing Pd.

According to a sixth aspect of the present invention, a method is provided for producing a hydrogen separator comprising a porous substrate having a large number of pores communicating from a first surface to a second surface thereof, and having a hydrogen-separating layer disposed on the first surface of the porous substrate so that the hydrogen-separating layer has a penetrated portion extending through the pores from the first surface to a particular depth. The method comprises the steps of preparing the porous substrate having an average pore diameter of 0.02 to 0.5 µm at the first surface whereon the hydrogen-separating layer is disposed, and forming, on the first surface of the porous substrate, the hydrogen-separating layer having a thickness of 1 to 5 µm, so that the penetrated portion of the hydrogen-separating layer has a penetration depth that is 0.05 to 1 µm from the first surface, that is at least equal to the average pore diameter of the first surface of the porous substrate, and that is not larger than one half of the thickness of the hydrogen-separating layer.

According to a seventh aspect of the present invention, a method for producing a hydrogen separator according to the sixth aspect is provided, wherein the hydrogen-separating layer is made by plating.

According to an eighth aspect of the present invention, a method for producing a hydrogen separator according to the sixth or seventh aspects is provided, wherein a surface roughness Ra at the first surface of the porous substrate whereon the hydrogen-separating layer is disposed is 1 µm or less.

According to a ninth aspect of the present invention, a method for producing a hydrogen separator according to any of the sixth through eighth aspects is provided, wherein the porous substrate is composed mainly of a ceramic.

According to a tenth aspect of the present invention, a method for producing a hydrogen separator according to any of the sixth through ninth aspects is provided, wherein the hydrogen-separating layer is made of a hydrogen permselective metal.

According to an eleventh aspect of the present invention, a method for producing a hydrogen separator according to the tenth aspect is provided, wherein the hydrogen permselective metal is Pd or an alloy containing Pd.

The hydrogen separator of the present inventor hardly generates defects such as cracks, peeling and the like in the hydrogen-separating layer, is superior in durability, and satisfies both of good hydrogen-separating ability and good hydrogen permeability. The method for producing a hydrogen separator according to the present invention can easily produce a hydrogen separator which hardly generates defects such as cracks, peeling and the like in the hydrogen-separating layer, which is superior in durability, and which satisfies both of good hydrogen-separating ability and good hydrogen permeability.

Figure 1:
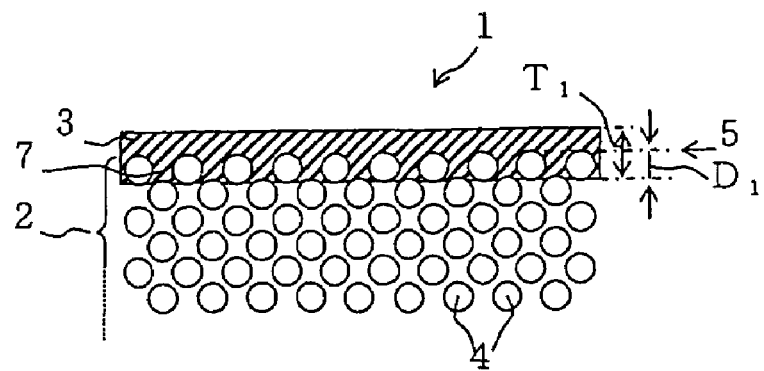
FIG. 1 is a sectional view schematically showing an embodiment of the hydrogen separator of the present invention.

In these drawing figures, reference numerals 1, 11, 21, 31 and 41 each respectively represent a hydrogen separator; reference numerals 2, 12, 22, 32 and 42 each respectively represent a porous substrate; reference numerals 3, 13, 23, 33 and 43 each respectively represent a hydrogen-separating layer; reference numeral 4 represents ceramic particles; reference numeral 5 represents the first surface of porous substrate; reference numeral 6 represents a crack; reference numerals 7, 17 and 27 each respectively represent a penetrated portion; $T_1$ is a thickness of hydrogen-separating layer; and $D_1$, $D_2$ and $D_3$ each respectively represent a penetration depth of the penetrated portion.

DETAILED DESCRIPTION OF THE INVENTION

The best mode for carrying out the present invention is described below. However, the present invention is not restricted to the following embodiment and it should be understood that, as long as there is no deviation from the gist of the present invention, changes, modifications, etc. can be made appropriately to the following embodiment based on the ordinary knowledge of those skilled in the art.

FIG. 1 is a sectional view showing an embodiment of the hydrogen separator of the present invention. As shown in FIG. 1, the hydrogen separator 1 of this embodiment has a porous substrate 2 having a large number of pores communicating from a first surface 5 thereof to a second surface (not shown), and a hydrogen-separating layer 3 is disposed on the porous substrate 2. The hydrogen-separating layer 3 is disposed on the first surface 5 of the porous substrate 2 in a state that the hydrogen-separating layer has a penetrated portion 7 extending through the pores from the first surface 5 to a particular depth. The hydrogen-separating layer 3 can selectively transmit only hydrogen in a hydrogen-containing gas (a to-be-treated gas) incoming from the first surface 5 or the second surface side of the porous substrate and can discharge the hydrogen from the second surface or the first surface 5 side. Thus, when the hydrogen separator 1 is used for separation of hydrogen from to-be-treated gas, it is possible that the to-be-treated gas is taken in from the first surface 5 side and is discharged from the second surface side, or is taken in from the second surface side and is discharged from the first surface 5 side.

Figure 4:
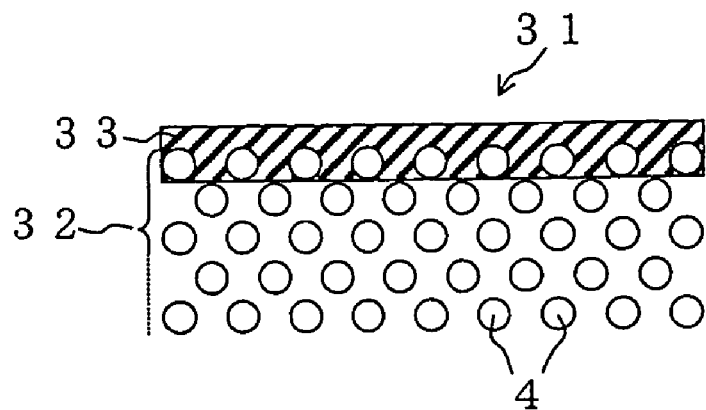
FIG. 4 is a sectional view schematically showing still another hydrogen separator.
Figure 5:
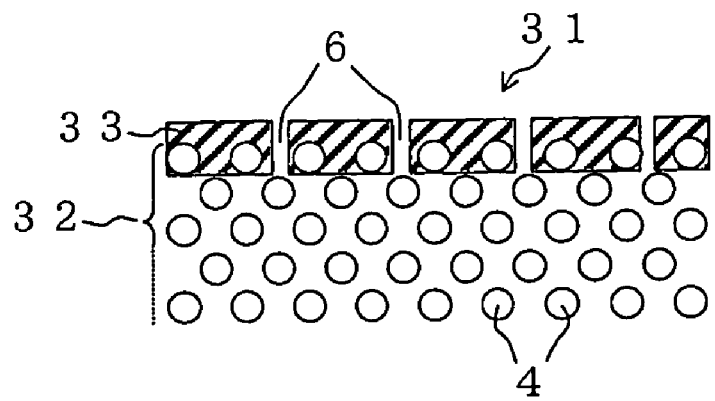
FIG. 5 is a sectional view schematically showing a state in which cracks have generated in the hydrogen-separating layer of the hydrogen separator of FIG. 4.
Figure 6:
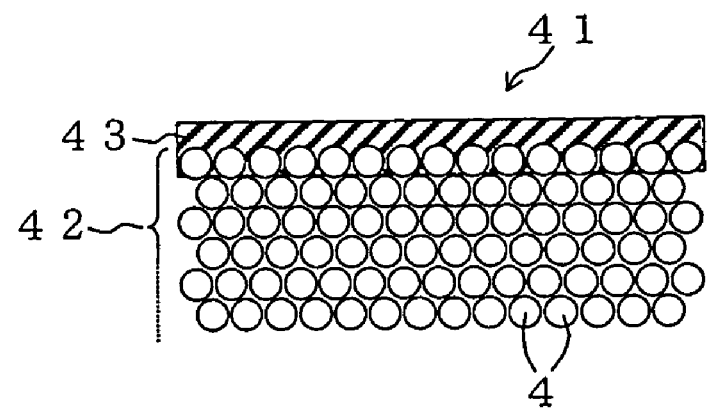
FIG. 6 is a sectional view schematically showing still another hydrogen separator.

In the hydrogen separator 1 of the present embodiment, the average pore diameter at the first surface 5 of the porous substrate 2 is 0.02 to 0.5 µm. When the average pore diameter at the first surface is less than 0.02 µm, as in, for example, the hydrogen separator 41 shown in FIG. 6, the hydrogen-separating layer 43 is peeled off easily, passing of gas through the inside of the porous substrate 42 is difficult, and good hydrogen permeability is difficult to obtain. Meanwhile, when the average pore diameter at the first surface is more than 0.5 µm, as in, for example, the hydrogen separator 31 shown in FIG. 4 or 5, passing of gas through the inside of the porous substrate 32 is easy but the hydrogen-separating layer 33 is not dense, inviting easy generation of defects such as cracks 6 and the like.

The average pore diameter at the first surface of the porous substrate is preferably 0.02 to 0.5 µm, more preferably 0.05 to 0.3 µm in order to provide a hydrogen separator which has even higher hydrogen permeability, is less in defects in the hydrogen-separating layer and is further superior in durability.

The thickness of the hydrogen-separating layer 3 of the hydrogen separator 1 of the present embodiment is 1 to 5 µm, preferably 2 to 5 µm. When the thickness of the hydrogen-separating layer 3 is less than 1 µm, the hydrogen-separating layer 3 tends to generate defects. Meanwhile, when the thickness is more than 5 µm, the hydrogen-separating efficiency of the hydrogen-separating layer 3 is low. Incidentally, in FIG. 1, the sum of the distance from the first surface 5 of the porous substrate 2 to the surface of the hydrogen-separating layer 3 and the penetration depth $D_1$ of the penetrated portion is expressed as "the thickness $T_1$ of hydrogen-separating layer" for convenience; however, in the present specification, the term "the thickness of hydrogen-separating layer" refers to a value obtained by measurement using an X-ray fluorescence film thickness tester. That is, "the thickness of hydrogen-separating layer" is a value calculated from the integration of the amounts of Pd present from the surface of the hydrogen-separating layer to the inside of the porous substrate.

Figure 2:
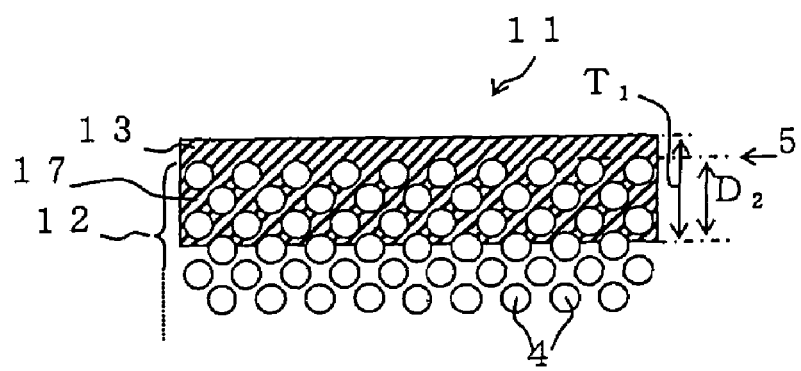
FIG. 2 is a sectional view schematically showing a hydrogen separator.
Figure 3:
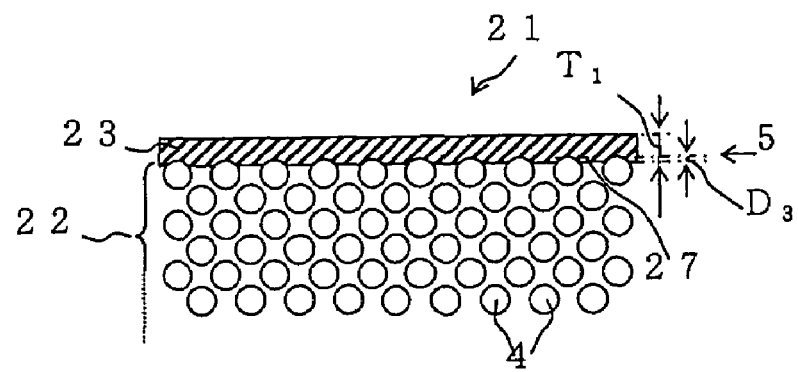
FIG. 3 is a sectional view schematically showing another hydrogen separator.

In the hydrogen separator 1 of the present embodiment, the penetration depth $D_1$ of the penetrated portion is 0.05 to 1 µm. When the penetration depth of the penetrated portion is less than 0.05 µm, as in, for example, the hydrogen separator 21 shown in FIG. 3, the penetration depth $D_3$ of the penetrated portion 27 is too small ($D_1 > D_3$); as a result, the adhesivity between the porous substrate 22 and the hydrogen-separating layer 23 is low and the hydrogen-separating layer 23 tends to peel off. Meanwhile, when the penetration depth of the penetrated portion is more than 1 µm, as in, for example, the hydrogen separator 11 shown in FIG. 2, the penetration depth $D_2$ of the penetrated portion 17 is large ($D_1 < D_2$); as a result, the porous substrate 22 and the hydrogen-separating layer 23 bond more strongly to each other and have higher adhesivity and the hydrogen separator 11 has good durability; meanwhile, passing of gas through the hydrogen-separating layer 23 is difficult and good hydrogen permeability is difficult to obtain.

The penetration depth $D_1$ of the penetrated portion is more preferably 0.1 to 0.8 µm in order to provide a hydrogen separator which has even higher hydrogen permeability, is less in peeling in the hydrogen-separating layer and is further superior in durability.

In the hydrogen separator 1 of the present embodiment, the penetration depth $D_1$ of the penetrated portion is at least equal to the average pore diameter at the first surface 5 of the porous substrate 2, more preferably at least equal to 1.5 times the average pore diameter. A penetration depth $D_1$ of the penetration portion, of less than the average pore diameter at the first surface 5 of the porous substrate 2 is not preferred because it tends to cause peeling of hydrogen-separating layer.

Also, the penetration depth $D_1$ of the penetrated portion is not larger than one half of the thickness $T_1$ of the hydrogen-separating layer. A penetration depth $D_1$ of the penetrated portion of larger than one half of the thickness $T_1$ of the hydrogen-separating layer is not preferred because it prevents permeation of hydrogen.

The surface roughness Ra of the first surface 5 of the porous substrate 2 is preferably 1 µm or less, more preferably 0.5 µm or less. When the surface roughness Ra is more than 1 µm, defects tend to generate in the hydrogen-separating layer. Incidentally, in the present invention, there is no particular restriction as to the lower limit of the surface roughness Ra of the first surface of the porous substrate; however, the surface roughness may be 0.01 µm or more in view of the actual producibility, etc. of hydrogen separator. In the present invention, the term "surface roughness Ra" refers to an arithmetic mean roughness mentioned in JIS B 0601 "Surface roughness-Definitions and designation".

The ratio (b/a) of the thermal expansion coefficient (b) of hydrogen-separating layer to the thermal expansion coefficient (a) of the porous substrate is preferably 0.7 to 1.5, more preferably 0.8 to 1.3. When the ratio (b/a) is less than 0.7, the thermal expansion coefficient (b) of the hydrogen-separating layer is too small as compared with the thermal expansion coefficient (a) of the porous substrate; as a result, when a heat cycle has been applied, the difference in thermal expansion coefficient between the hydrogen-separating layer and the porous substrate tends to cause peeling of the hydrogen-separating layer from the porous substrate. Meanwhile, when the ratio (b/a) is more than 1.5, the thermal expansion coefficient (a) of the porous substrate is too small as compared with the thermal expansion coefficient (b) of the hydrogen-separating layer; as a result, when a heat cycle has been applied, the difference in thermal expansion coefficient between the hydrogen-separating layer and the porous substrate tends to cause peeling of the hydrogen-separating layer from the porous substrate, as well.

The porous substrate 2 is preferred to be composed mainly of a ceramic. Thereby, the porous substrate 2 is superior in heat resistance and corrosion resistance, for example, and provides a hydrogen separator 1 having high mechanical strengths. As to the kind of the ceramic, there is no particular restriction, and any ceramic ordinarily used in hydrogen separators can be employed. There can be mentioned, for example, alumina, silica, silica-alumina, mullite, cordierite and zirconia. Incidentally, the porous substrate 2 may contain, as components other than the ceramic, small amounts of components present inevitably and components added ordinarily. By using two or more kinds of ceramics or a ceramic/metal complex, the thermal expansion coefficient of the porous substrate 2 may be controlled.

The porous substrate 2 has a large number of fine pores communicating three-dimensionally. The diameters of the pores are preferably 0.02 to 0.5 µm. When the pore diameters are less than 0.02 µm, the resistance against gas permeation may be large. Meanwhile, when the pore diameters are more than 0.5 µm, in forming a hydrogen-separating layer 3 in production of a hydrogen separator 1, it is difficult to plug the pores of porous substrate with a hydrogen permselective metal, which may result in reduced gas tightness.

The pores of the porous substrate 2 are preferred to be uniform in diameter. With the uniformity in diameter, it is possible to avoid a problem that there are formed those pores not filled with a hydrogen permselective metal, inviting a reduction in gas tightness.

The hydrogen-separating layer 3 is preferred to be constituted by a hydrogen permselective metal. As to the kind of the hydrogen permselective metal, there is no particular restriction as long as the metal allows for selective permeation of hydrogen. As such a metal, there is specifically preferred Pd or an alloy containing Pd. Pd is preferred because it allows for selective and efficient permeation of hydrogen alone. As the alloy containing Pd, there are preferred an alloy between Pd and Ag and an alloy between Pd and Cu. By alloying Pd with Ag or Cu, the embrittlement of Pd by hydrogen is prevented and there can be obtained a higher efficiency for hydrogen separation at high temperatures.

There is no particular restriction as long as the way to form the hydrogen-separating layer 3 on the first surface 5 of the porous substrate 2. As such a hydrogen-separating layer, there is preferred to be formed by plating, sputtering, chemical vapor deposition (CVD) or the like. There is more preferred to be formed the hydrogen-separating layer by plating, especially as it is easy to form on larger substrate.

Next, description is made of an embodiment of the method for production of a hydrogen separator according to the present invention. In the method for production of the hydrogen separator according to this embodiment, first, there is prepared a porous substrate 2 such as shown in FIG. 1, having an average pore diameter of 0.02 to 0.5 µm at the first surface 5 thereof. As to the method for production of the porous substrate 2, there is no particular restriction, and the porous substrate 2 can be produced by a conventional known method. Incidentally, the average pore diameter at the first surface 5 can be controlled at a desired level by appropriately selecting the shape, diameter, etc. of the ceramic particles used and the kind, amount, etc. of the pore former used.

Next, a plating treatment is conducted to form a hydrogen-separating layer 3 having a penetrated portion 7 extending from the first surface 5 of the porous substrate 2 to a depth of 0.05 to 1 µm. In order to allow the hydrogen-separating layer 3 to have a particular thickness, for example, the time of dipping of porous substrate 2 in plating solution used is set appropriately. In order to allow the penetrated portion 7 formed, to have a particular depth, there is used for plating, for example, appropriate suction by a vacuum pump or the like, at the second surface side opposite to the first surface 5 side of the porous substrate 2. The depth of the penetrated portion 7 can be controlled by maintaining the pressure employed in suction at a particular level during plating, or by varying the pressure during plating.

In order to form the hydrogen-separating layer 3 on the first surface 5 of the porous substrate 2 by plating, it is preferred to employ, for example, chemical plating. In forming Pd on the first surface 5 of the porous substrate 2 by chemical plating, first, the porous substrate 2 is immersed in a solution containing an activating metal, to adhere the solution containing an activating metal onto the first surface 5, and washed with water. As the activating metal, a compound containing bi-valent palladium can be used preferably. In order to adhere the activating metal onto the first surface 5, it is preferred, when, for example, Pd is used as a hydrogen permselective metal, to dip the porous substrate 2 in an aqueous hydrochloric acid solution of palladium chloride and an aqueous hydrochloric acid solution of tin chloride alternately.

After the activating metal has been adhered onto the first surface 5, the first surface 5 side of the porous substrate 2 is dipped in a plating solution containing a hydrogen permselective metal (for example, Pd) and a reducing agent. Thereby, Pd is deposited with the activating metal used as a nucleus and a hydrogen-separating layer 3 made of Pd is formed. As the reducing agent, there can be mentioned, for example, hydrazine, dimethylamine boran, sodium phosphinate and sodium phosphonate.

When there is used an alloy of Pd and Ag as the hydrogen permselective metal constituting the hydrogen-separating layer 3, a layer made of Pd is formed on the first surface 5 by chemical plating; then, Ag is plated on the layer made of Pd. Thereafter, heating is conducted to give rise to mutual diffusion between Pd and Ag, whereby can be formed a hydrogen-separating layer 3 using an alloy of Pd and Ag as the hydrogen permselective metal. Incidentally, in plating Ag on the layer made of Pd, there is preferred chemical plating, or electroplating using the layer made of Pd as an electrode. In this case, the mass ratio (Pd Ag) of Pd and Ag used is preferably 90:10 to 70:30.

EXAMPLES

The present invention is described specifically below by way of Examples. However, the present invention is in no way restricted to these Examples.

Example 1

There was prepared, as a porous substrate, an α-alumina porous cylindrical tube having an outer diameter of 10 mm, an inner diameter of 7 mm, a length of 300 mm and an average pore diameter at the outer surface of 0.2 μm. This α-alumina porous tube was washed with water and then subjected to an activation treatment. The activation treatment was carried out by dipping the α-alumina porous tube in a solution containing bi-valent Pd ion and then conducting a reduction treatment. The α-alumina porous tube after the activation treatment was dipped in a solution (a plating solution) containing a Pd salt, a complexing agent and a reducing agent, to conduct chemical plating of Pd on the outer surface of the α-alumina porous tube to form a Pd film. Incidentally, in the chemical plating, a vacuum pump was used to make pressure difference between the inner side and the outer side of the α-alumina porous tube. Next, an Ag film was formed on the Pd film by electroplating. Incidentally, the mass ratio of Pd and Ag was controlled at 80:20. The resulting porous tube was heat-treated in Ar gas at 800° C. for 1 hour for alloying, whereby a Pd alloy film was formed and a hydrogen separator (Example 1) was produced. The thickness of the Pd alloy film (hydrogen-separating layer) was 2 μm and the depth of the Pd alloy penetrated into the α-alumina porous tube was 0.5 μm. Incidentally, the thickness of the Pd alloy film was measured using an X-ray fluorescence film thickness tester, and the depth of the Pd alloy penetrated into the α-alumina porous tube was measured by observing the section of the produced hydrogen separator using an electron microscope.

Examples 2 to 8 and Comparative Examples 1 to 11

Each hydrogen separator (Examples 2 to 8 and Comparative Examples 1 to 11) was each produced in the same manner as in Example 1, except that there was used an α-alumina porous cylindrical tube having an average pore diameter (μm) at the outer surface shown in Table 1 and that there was formed a Pd alloy film (a hydrogen-separating layer) on the outer surface having a thickness (μm) shown in Table 1 with the depth (μm) of the Pd alloy penetrated into the α-alumina porous tube shown in Table 1. Incidentally, in each hydrogen separator, the thickness of the Pd alloy film was appropriately controlled by varying the time of dipping of the α-alumina porous tube in the plating solution used. The depth of the Pd alloy penetrated into the α-alumina porous tube was appropriately controlled by varying the suction pressure of the vacuum pump used.

(Measurement of Helium Gas Leakage Amount)

He gas at a pressure of 800 kPa was introduced into the Pd alloy film side of each of the hydrogen separators (Examples 1 to 8 and Comparative Examples 1 to 11) to measure the amount of He gas leaked to the inner surface side of the α-alumina porous tube of the hydrogen separator.

The results of measurement of He gas leakage amount are shown in Table 1.

(Measurement of Hydrogen Permeation Constant)

Each of the hydrogen separators (Examples 1 to 8 and Comparative Examples 1 to 11) was heated at 500° C. in an electric furnace. In this state, $H_2$ gas was introduced while the pressure of $H_2$ gas applied to the Pd alloy film of the outer surface side of the α-alumina porous tube of the hydrogen separator was varied, to measure the amount of $H_2$ gas permeation to the inner surface side of the α-alumina porous tube. The results of measurement of hydrogen permeation constant are shown in Table 1.

(Evaluation)

Each hydrogen separator was evaluated in one of four levels A to D according to the following parameters. The results of the evaluation are shown in Table 1.

[A] The He gas leakage amount is less than 0.01 ml/($cm^2 \cdot min$); the hydrogen permeation constant is 100 ml/($cm^2 \cdot min \cdot Pa^{1/2}$) or more; the product of hydrogen permeation constant and thickness of hydrogen-separating layer is 500 [ml/($cm^2 \cdot min \cdot Pa^{1/2}$)]·μm or more.

[B] Measurement of He gas leakage amount is possible and the amount is 0.01 ml/($cm^2 \cdot min \cdot Pa^{1/2}$) or more.

[C] There is peeling of hydrogen-separating layer, gas leakage amount is excessive, and measurement of He gas leakage amount or hydrogen permeation constant is impossible.

[D] He gas leakage amount is less than 0.01 ml/($cm^2 \cdot min$) and hydrogen permeation constant is less than 100 ml/($cm^2 \cdot min \cdot Pa^{1/2}$), or the product of hydrogen permeation constant and thickness of hydrogen-separating layer is less than 500 [ml/($cm^2 \cdot min \cdot Pa^{1/2}$)]·μm.

The reason why each hydrogen separator was evaluated according to the above parameters is as follows. A large hydrogen permeation constant is desired in order to reduce the amount of Pd used, and hydrogen permeation constant is proportional to the reciprocal of the thickness of hydrogen-separating layer; therefore, it can be viewed that, with a larger product of hydrogen permeation constant and thickness of hydrogen-separating layer, the properties of Pd alloy film are utilized more efficiently. Incidentally, the reason why there were used, in the above parameters for evaluation, a hydrogen permeation constant of 100 ml/(cm$^2$·min·Pa$^{1/2}$) or more and a product of hydrogen permeation constant and thickness of hydrogen-separating layer, of 500 [ml/(cm$^2$·min·Pa$^{1/2}$)]·μm or more, is that there was used a Pd/Ag alloy of Pd:Ag mass ratio of 80:20, as the hydrogen permselective metal constituting the hydrogen-separating layer. Therefore, when there is used a Pd alloy of other composition or Pd, as the hydrogen permselective metal, it is naturally preferred to use, as the parameters for evaluation, values corresponding to the other composition.

TABLE 1

|  | Ex. 1 | Ex. 2 | Ex. 3 | Ex. 4 | Ex. 5 | Ex. 6 | Ex. 7 | EX. 8 | Comp. Ex. 1 | Comp. Ex. 2 |
|---|---|---|---|---|---|---|---|---|---|---|
| Average pore diameter(μm) | 0.2 | 0.05 | 0.1 | 0.2 | 0.5 | 0.02 | 0.02 | 0.2 | 0.01 | 0.01 |
| Thickness of Hydrogen-separating layer(μm) | 2.0 | 2.0 | 2.1 | 1.0 | 2.1 | 1.0 | 1.9 | 5.2 | 2.1 | 2.0 |
| Penetration depth of penetrated portion(μm) | 0.5 | 0.07 | 0.4 | 0.5 | 1.0 | 0.05 | 0.05 | 1.0 | 0.01 | 0.08 |
| He gas leakage amount(ml/(cm$^2$·min)) | 0.005 | 0.004 | 0.002 | 0.007 | 0.002 | 0.008 | 0.003 | 0.001 | — | — |
| Hydrogen permeation constant (ml/(cm$^2$·min·Pa$^{1/2}$)) | 255 | 268 | 253 | 516 | 240 | 543 | 281 | 109 | — | — |
| Hydrogen permeation constant × thickness of hydrogen-separating layer ((ml/(cm$^2$·min·Pa$^{1/2}$))·μm) | 510 | 536 | 531 | 516 | 504 | 543 | 534 | 567 | — | — |
| Evaluation | A | A | A | A | A | A | A | A | C | C |

|  | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|
| Average pore diameter(μm) | 0.02 | 0.1 | 0.2 | 0.2 | 0.2 | 0.2 | 1.0 | 1.0 | 1.0 |
| Thickness of Hydrogen-separating layer(μm) | 2.2 | 2.2 | 0.7 | 2.1 | 2.0 | 10.1 | 2.0 | 5.1 | 10.0 |
| Penetration depth of penetrated portion(μm) | 0.01 | 1.3 | 0.3 | 0.1 | 1.5 | 0.9 | 1.1 | 2.0 | 2.1 |
| He gas leakage amount(ml/(cm$^2$·min)) | — | 0.002 | 0.093 | — | 0.002 | 0.000 | 0.103 | 0.056 | 0.002 |
| Hydrogen permeation constant (ml/(cm$^2$·min·Pa$^{1/2}$)) | — | 171 | 723 | — | 151 | 58 | 244 | 129 | 71 |
| Hydrogen permeation constant × thickness of hydrogen-separating layer ((ml/(cm$^2$·min·Pa$^{1/2}$))·μm) | — | 376 | 506 | — | 302 | 586 | 488 | 658 | 710 |
| Evaluation | C | D | B | C | D | D | B | B | D |

It was found from the results of Table 1 that the hydrogen separators of Examples 1 to 8, as compared with the hydrogen separators of Comparative Examples 1 to 11, are small in He gas leakage amount (high in gas tightness), are large in hydrogen permeation constant (high in hydrogen permeability), hardly generate defects (e.g. peeling of hydrogen-separating layer), and are superior in durability.

INDUSTRIAL APPLICABILITY

The hydrogen separator of the present invention hardly generates defects such as cracks, peeling and the like in the hydrogen-separating layer, is suitable for use at high temperatures or for long-term use, and is useful as a separator for selectively taking out only hydrogen from a hydrogen-containing gas such as steam-reformed gas or the like.

What is claimed is:

1. A hydrogen separator comprising:
    a porous substrate having a large number of pores communicating from a first surface to a second surface thereof; and
    a hydrogen-separating layer disposed on the first surface of the porous substrate in a state that the hydrogen-separating layer has a penetrated portion extending through the pores from the first surface to a particular depth;
    wherein an average pore diameter at the first surface of the porous substrate whereon the hydrogen-separating layer is disposed is 0.02 to 0.5 μm;
    wherein a thickness of the hydrogen-separating layer is 1 to 5 μm;
    wherein the first surface of the porous substrate on which the hydrogen-separating layer is disposed has a surface roughness Ra of 1 μm or less; and
    wherein a penetration depth of the penetrated portion is 0.05 to 1 μm, is at least equal to the average pore diameter at the first surface of the porous substrate whereon the hydrogen-separating layer is disposed, and is not larger than one half of the thickness of the hydrogen-separating layer.

2. The hydrogen separator according to claim 1, wherein the porous substrate mainly comprises a ceramic.

3. The hydrogen separator according to claim 1, wherein the hydrogen-separating layer is made of a hydrogen permselective metal.

4. The hydrogen separator according to claim 3, wherein the hydrogen permselective metal is one of Pd and an alloy containing Pd.

5. A method for producing a hydrogen separator comprising the steps of:

preparing a porous substrate having a large number of pores communicating from a first surface to a second surface thereof, the pores at the first surface having an average pore diameter of 0.02 to 0.5 μm, and the first surface having a surface roughness Ra of 1 μm or less; and forming, on the first surface of the porous substrate, a hydrogen-separating layer having a thickness of 1 to 5 μm, in a state that the hydrogen-separating layer has a penetrated portion extending through the pores from the first surface to a penetration depth that is 0.05 to 1 μm from the first surface, that is at least equal to the average pore diameter of the first surface of the porous substrate, and that is not larger than one half of the thickness of the hydrogen-separating layer.

6. The method for producing a hydrogen separator according to claim 5, wherein the hydrogen-separating layer is made by plating.

7. The method for producing a hydrogen separator according to claim 5, wherein the porous substrate mainly comprises a ceramic.

8. The method for producing a hydrogen separator according to claim 5, wherein the hydrogen-separating layer is made of a hydrogen permselective metal.

9. The method for producing a hydrogen separator according to claim 8, wherein the hydrogen permselective metal is one of Pd and an alloy containing Pd.

* * * * *